June 28, 1932.   R. F. MALLINA   1,865,028
FILM EDITING SYSTEM
Filed March 1, 1930

INVENTOR
R. F. MALLINA
BY
G. H. Heydt
ATTORNEY

Patented June 28, 1932

1,865,028

UNITED STATES PATENT OFFICE

RUDOLPH F. MALLINA, OF NEW YORK, N. Y., ASSIGNOR TO BELL TELEPHONE LABORATORIES, INCORPORATED, OF NEW YORK, N. Y., A CORPORATION OF NEW YORK

FILM EDITING SYSTEM

Application filed March 1, 1930. Serial No. 432,378.

This invention relates to film editing systems.

The present-day film for moving pictures with sound is a composition of a sound film and a plurality of films having pictures thereon taken with a plurality of cameras from different angles and different distances. In the production of a master film of this type a very important part is taken by the film editor. All of the pictures taken must be viewed in their proper order to choose the sections of each film to be used in making up this master film for projection. For this form of film editing it may be seen that a bank of film editing machines synchronously run in either direction under the control of the editor would greatly simplify the work of preparing a master film. Each of the pictures taken may be mounted in separate film viewing machines, only one machine having a sound film. The sound film must be in synchronism with the pictures on said plurality of films and must also be in synchronism with the various sections which are selected for use in the master picture film. In such an arrangement the film viewing lenses of said plurality of machines must be placed in a position convenient for the editor in observing any of the pictures.

An object of this invention is therefore to provide a supporting framework and driving mechanism for a bank of film editing machines arranged for simultaneous operation to show various pictures of the same subject and formed into an arc with the film viewing lenses of said machines in alignment with the center of said arc.

One embodiment of the present invention comprises a framework for supporting a plurality of film editing machines, one of which has a sound reproducing unit thereon. This framework includes supporting members for the machines formed in an arc and arranged so that the film viewing lenses are in alignment with the center of the arc, and also includes a table for supporting a common driving motor and other mechanism for controlling the driving apparatus of the film editing machine bank. The film editing machines are connected together by driving shafts having universal joints between each machine.

Figure 1:
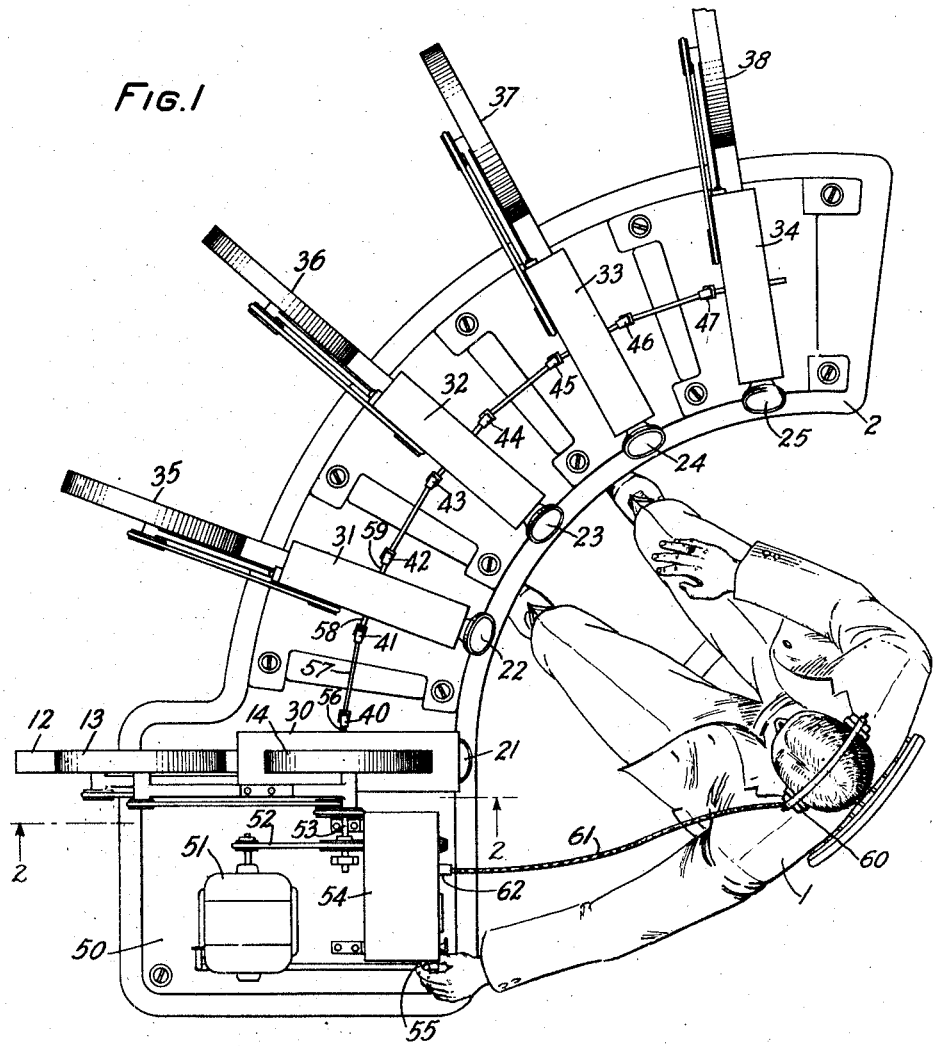
Figure 2:
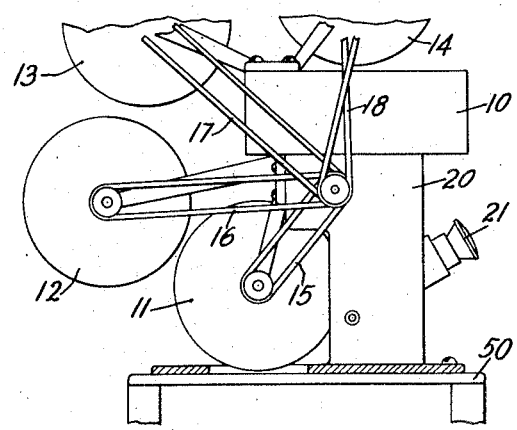

In the illustrated embodiment, Fig. 1 shows a plan view of an arcuate bank of film editing machines incorporating this invention. Fig. 2 shows a side elevation of the first film editing machine in the bank.

The film editing machines are shown at 30, 31, 32, 33 and 34. It is obvious that any desired number of such editing machines may be used. Editing machine 30 incorporates both a film viewing machine and a sound reproducer, such as shown in Fig. 2. In this figure the film viewing machine is shown at 20 with lens 21 for viewing the pictures of the film. The sound reproducing unit is shown at 10. This device is preferably of the type shown in appliction, Serial No. 432,379 filed March 1, 1930, by J. J. Kuhn and R. V. Terry. Four reels are shown which may be used when separate picture and sound films are edited, reels 13 and 14 being used for the sound film and reels 11 and 12 for the picture film. It is not ordinarily necessary to have more than one sound reproducing unit in a bank of film editing machines. For this reason only editing machine 30 has been shown with a sound reproducing unit. The remaining machines 31 to 34, inclusive, are limited to picture film editing. These picture film editing machines may be of the same general type disclosed in the above mentioned patent application but are simplified in that no provision is made for handling sound film.

Films having various views of the same subject taken with a plurality of cameras may be mounted on picture reels 12, 35, 36, 37 and 38 and properly positioned before the viewing lenses 21 to 25, inclusive. A sound film, which has thereon the accompaniment for all of the pictures may be mounted on reel 13 and positioned in the sound unit in synchronous relation to all of the picture films. It is understood that the sound film and picture films are arranged for delivery to take up reels as the films progress through the machines.

The frame 2, on which the editing machines are mounted, is made in the form of an arc with supports for the plurality of machines accurately positioned so that the optical centerlines of the respective machines are continuations of radii from the center of the arc, enabling an editor 1 to observe a picture under any lense by shifting his vision using the center of the arc as a pivoting point. This is accomplished by either pivoting in the chair or pivoting the head. In accordance with this invention a pivoted seat is provided, said pivoting seat bringing the observer's eyes accurately to the center point of the arc. Frame 2 is shaped at one end for supporting a panel 50 for the driving motor 51 and amplifier 54. The motor 51 is connected by belt 52 to shaft 53 which terminates in a gear set for driving the film sprockets of the editing machine 30 and also for driving shaft 56 which is connected to universal joint 40. Each editing machine is connected to a universal joint on each side, such as 41 to 47, inclusive. Intermediate between these universal joints are shafts such as shaft 57. The motor 51 thus drives the films in all the editing machines at like speeds. The individual editing machines are driven through gear connections to their respective shafts 57.

The speed of the motor and the direction of rotation of the motor armature is controlled by lever arm 55 used for adjusting the motor brushes. This manner of controlling motors is well known and will not be discussed in this application.

The editor listens to the sound effects accompanying the pictures by the use of head receiver 60 which is connected to amplifier 54 by cord 61 and plug 62.

Let it be assumed that a plurality of pictures of the same subject or subjects and objects has been taken with a plurality of cameras, some of the pictures being what are known as close-ups, other pictures distant views and still other pictures taken from different angles. Sections of each film may be used to make up a master picture film. The sound film is arranged to accompany all picture films and thus the sections of the various picture films must be cut and spliced together into the master film accurately to make all of the master picture film synchronous with the sound film. In reviewing the various pictures, each picture film is studied separately. The editor may however look from one editing machine lense to another for comparison in selecting film sections according to the effect desired in a particular section of the master film. This study of the films or sections thereof may be repeated any number of times, without removing the films from the machines, by adjusting the motor 51 with control lever 55 to operate the editing machines 30 to 34 inclusive in either direction. A considerable advantage is obtained in the ability to successively review the pictures in two or three of the machines to adjudge the merits of the views provided on the films for selection of the most pleasing effect in consideration of the sound accompaniment.

A further advantage of great value is obtained in the ease with which films may be marked for cutting. Let it be assumed that a section of one film mounted in machine 22 has been selected for the master film and that the next succeeding section for the master film is to be selected from a film on machine 24. The two sections will ordinarily follow in succession on the separate films and the films may be properly marked with the editing machines set in a single position. Thus the chances for error in properly synchronizing the various sections of picture with the sound film are greatly reduced with this type of film editing machine bank.

What is claimed is:

1. A film editing system in which a plurality of synchronously operated motion picture films may be simultaneously observed and compared with a synchronously operated sound record film for the selection of scenes to be composited into a master film, a plurality of picture editing machines each having a viewing lens for magnifying the picture and at least one having a sound reproducing unit, means including a framework for supporting said machines in an arc with the optical center lines of their respective viewing lenses forming continuations of radii from the center of said arc and so arranged that an editor may view any of said pictures from the center of said arc, means for simultaneously and synchronously running the picture and sound films through said machine, means for controlling the direction of travel of said films for repeated inspection and comparison of the various pictures with accompanying sound, means for stopping said machine and consequently the movement of said film at any film sections during the progress of the films through said machines, and means arranged to accommodate the marking of a plurality of films to be spliced together at the positions marked to form a master picture film whose parts are synchronously positioned with relation to the sound record on said sound film.

2. The method of producing a composite motion picture film from sections of a plurality of picture films consisting in placing a plurality of film editing machines in the form of an arc with the optical center lines of their film viewing lenses converging toward the center of said arc, in running said machines in synchronism with each other, in placing a plurality of picture films and one sound film in said machines, the picture films having views thereon recorded with a plurality of cameras in synchronism with the recording of accompanying sounds on said single sound film, in simultaneously and synchronously running said films through said machines in either of two directions for inspection, in repeating the inspection of any particular section of any one of said films, in selecting particular views for the composite film and in marking said various picture films at positions to be spliced together to form the composite picture film of selected views in exact synchronism with the sounds of said sound film.

In witness whereof, I hereunto subscribe my name this 17th day of February, 1930.

RUDOLPH F. MALLINA.